Nov. 16, 1965  T. PATRIGNANI  3,217,553
TRANSMISSION DEVICE
Original Filed May 10, 1962  2 Sheets-Sheet 1
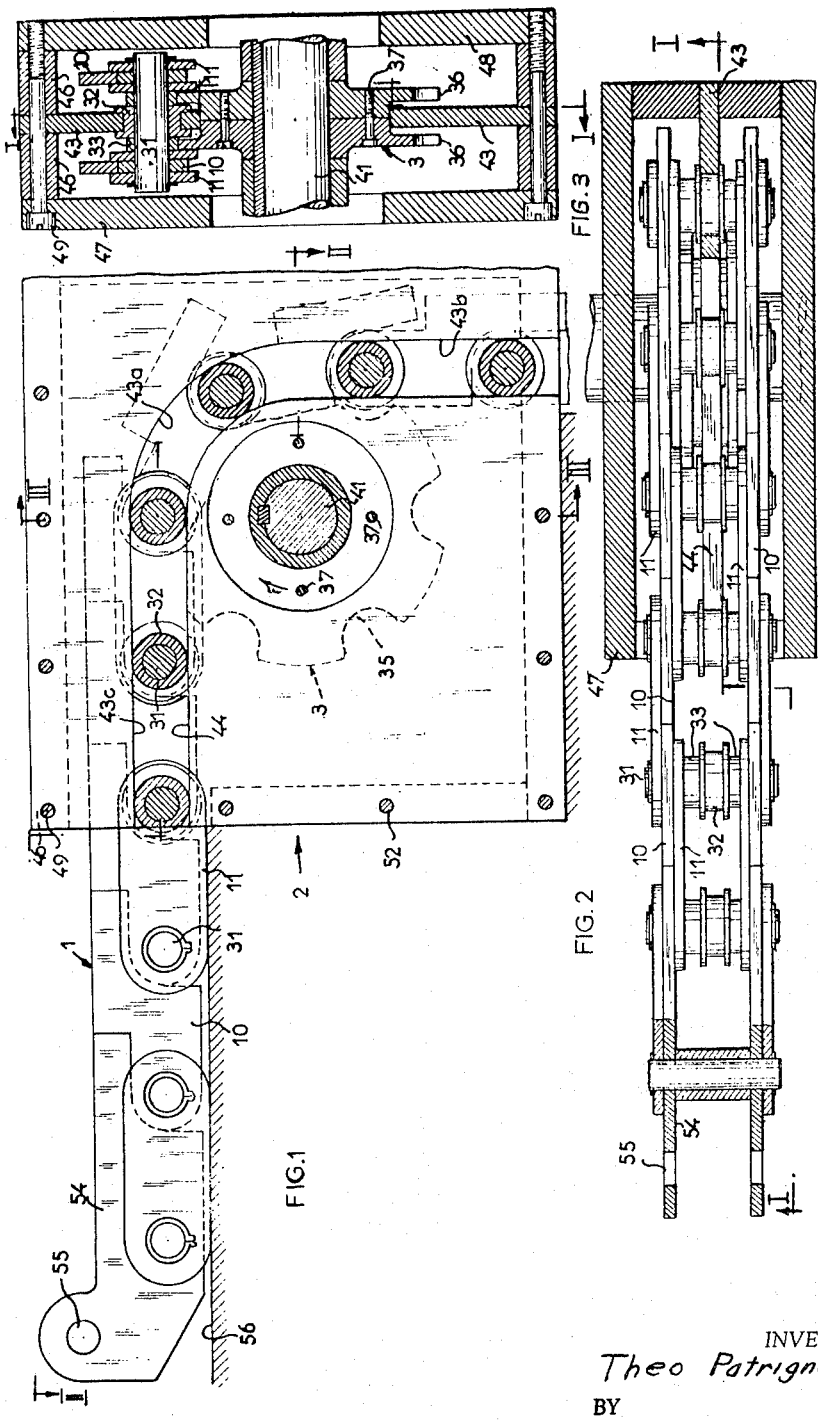
INVENTOR.
Theo Patrignani
BY
Glascock, Downing & Seebold
ATTORNEYS Nov. 16, 1965  T. PATRIGNANI  3,217,553
TRANSMISSION DEVICE Original Filed May 10, 1962

INVENTOR.
Theo Patrignani
BY
Glascock, Downing & Seebold
ATTORNEYS

United States Patent Office 3,217,553
Patented Nov. 16, 1965

3,217,553
TRANSMISSION DEVICE
Theo Patrignani, Paris, France, assignor to Centre d'Etudes et d'Applications des Techniques de Production, a company of France
Original application May 10, 1962, Ser. No. 193,825, now Patent No. 3,153,940, dated Oct. 27, 1964. Divided and this application Sept. 8, 1964, Ser. No. 394,805
Claims priority, application France, May 18, 1961, 862,224; Jan. 12, 1962, 884,626, Patent 80,919
3 Claims. (Cl. 74—219)

This invention relates to push-pull chains which may be placed under endwise compression and used, for example, for displacing a load over a horizontal surface, and this application is a division of my copending application Serial No. 193,825, filed May 10, 1962, now U.S. Patent No. 3,153,940.

Such push-pull chains usually comprise a plurality of links hinged together, and means which abut in a manner to prevent the chain from bending by rotation of the links about the hinges in one direction, but which allow the chain to bend freely in the opposite direction.

When a chain of this known type is passed over a sprocket wheel, the bend around the sprocket wheel must be in the direction in which the chain is free to bend and a guide surface concentric with the sprocket wheel must be provided to prevent the chain being pushed off the sprocket wheel when transmitting a compression load. When the chain is used to transmit a compression load around a bend in the manner just described, the chain links are forced into contact with the guide surface around the sprocket wheel and slide thereover, which circumstance gives rise to considerable friction.

It has already been proposed to overcome this drawback by providing on the links of the chain a series of guide rollers which bear on the concentric guide surface so that when the chain is used to transmit compression round a pulley, the rollers and not the links bear on the guide surface.

When it is desired to operate the chain by means of a sprocket wheel, and more particularly to transmit compression round the sprocket wheel, the guide rollers carried by the chain will be forced into contact not only with the guide surface around the sprocket wheel, but also with the flanks of the sprocket teeth, and the resulting friction between the sprocket teeth and the guide rollers will prevent the latter from rolling on the guide surface as the chain moves under compression.

The main object of the present invention is to provide a push-pull roller chain of the type described, the links of which may be restrained to motion in a path concentric with a sprocket wheel with a marked reduction in friction.

A further object of the invention is to provide a push-pull roller chain of the type described, in which the guide rollers are associated with drive rollers, and to provide a driving or driven sprocket wheel engaging only said drive rollers so that the guide rollers are never forced into contact with the sprocket teeth.

Further objects and advantages of the invention will become more readily apparent from the following description taken in conjunction with the accompanying drawings, wherein:

FIGURE 1 is a sectional view taken through the broken lines I—I of FIGURE 2, showing a transmission device according to the invention;

FIGURE 2 is a longitudinal sectional view through the line II—II in FIGURE 1;

FIGURE 3 is a cross-section taken through the line III—III in FIGURE 1;

Figure 9:
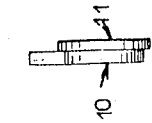
FIGURES 8 and 9 are plan and profile views, respectively, corresponding to FIGURE 7; and, FIGURES 10 and 11 are front views of the two types of plate used to constitute the chain.

The transmission device shown in FIGS. 1 to 3 consists essentially of a chain of special structure generally designated by the reference numeral 1, a casing 2, and a sprocket wheel 3 mounted therein, over which the chain runs.

Figure 7:
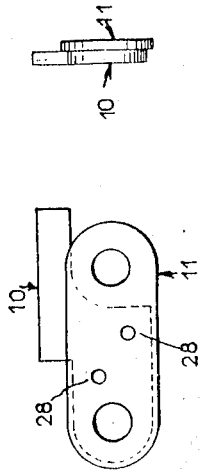
FIGURE 7 shows a link which is symmetrical to that of FIGURES 4 to 6.
Figure 8:
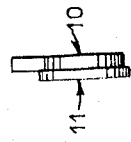
Figure 6:
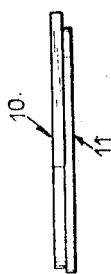
FIGURES 5 and 6 are respectively views in section through the line V—V in FIGURE 4 and in profile corresponding to FIGURE 4.
Figure 4:
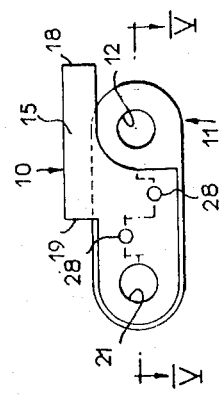
FIGURE 4 is a front view of a single link of the chain in the device shown in FIGURES 1 to 3.
Figure 5:
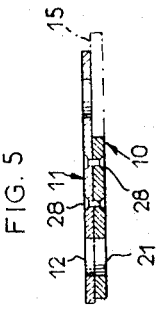

The chain 1 is composed of two sections, each of which consists of a succession of links which are disposed alternately and symmetrically relative to their longitudinal median plane, and these links will hereinafter be designated as right-hand links for those of the type shown in FIGS. 4 to 6, and as left-hand links for those of the type shown in FIGURES 7 to 9.

Figure 11:
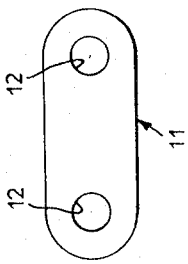
Figure 10:
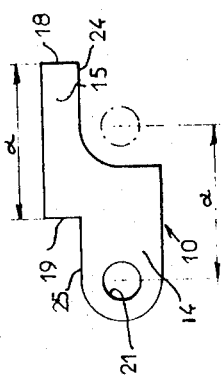

Each right or left-hand link consists of an assembly of two plates, to wit, a main plate such as illustrated in FIGURE 11, and an auxiliary plate as shown in FIGURE 10, the sense in which any two such plates are assembled together merely differing according to whether it is required to obtain a right- or a left-hand link.

The mainplate 11 is of generally rectangular shape, and its ends are formed in semi-circles concentric with the holes 12 through which extend the link coupling pivots.

The auxiliary plate 10 is of very special shape and provided, above a supporting portion 14 which is similar to a mainplate section, with a rectangularly shaped projection 15 which is parallel to the general direction of the link and offset in relation to the plane containing the link pivots.

The projection 15 is provided with a first operative front face 18 and a first operative rear face 19, both perpendicular to the plane containing the link pivots. The distance between the faces 18 and 19 is equal to the distance $d$ between the centers of the holes accommodating the two pivots of any single link.

The projection 15 is provided with a second operative front face 24 and a second operative rear face 25, located in the same plane and parallel to the plane containing the pivots and on the same side thereof as the first two operative faces referred to precedingly.

In any given section of a straight length of chain, such as that illustrated in the upper portion of FIGURE 1, the front operative faces of each link abut against the rear operative faces of the next link.

For the purpose of simplifying manufacture, it may be convenient to ensure that while the chain is still new only the second operative faces 24 and 25 will be in contact from one link to the next, and that a slight clearance be provided between the corresponding first operative faces 18 and 19, but that after a certain amount of wear has taken place, all the aforementioned operative faces should eventually be in contact with one another.

The supporting portion 14 of each auxiliary plate 10 is provided with a hole 21 through which extends one pivot of the corresponding link but not the other.

In order to properly distribute the fatigue sustained by the various component parts of the chain links, the rear operative face 19 is contained in a plane located close to the center of the line joining the two holes of a link.

Each auxiliary plate, as exemplified by reference numeral 10, is fixed flat on a main plate 11, by means, for instance, of two rivets 28 (see FIGURE 4) or alternatively by welding or any other convenient means, the pivot holes being coincident on one side or the other, depending on whether a right-hand link (FIGURES 4 to 6) or a left-hand link (FIGURES 7 to 9) is involved.

Along each section of a mounted chain executed in accordance with this invention, the auxiliary plates 10 (see FIGURE 2) will be contained in the same plane, and since the right-hand links are assembled in alternation with the left-hand links, the mainplates 11 will be located alternately to the right and to the left of that plane. The impaction obtained thus enhances the resistance of the chain of transverse flexing.

Each pivot such as 31 (see FIGURE 3) thus extends successively, for the first chain section, through a mainplate 11, an auxiliary plate 10 and a second mainplate 11, then, for the second chain section, through another mainplate, auxiliary plate and ultimate mainplate.

Each pivot 31 supports three further freely rotatable rollers, to wit a flanged guiding roller 32 midway along the pivot and a transmission roller 33 on each side thereof.

The transmission rollers 33 are designed to lodge in the hollows between the teeth 35 of the sprocket 3, and to this end the said sprocket 3 is provided with two rows of teeth 36 contained in two parallel planes the spacing between which is equal to that between the rollers 33.

In the interests of simplified assembly, which will be explained in greater detail hereinafter, the sprocket 3 is built in two parts, each of which carries one of the aforementioned sets of teeth. The two parts may be assembled together by any convenient means, such as screws 37 for example. The sprocket 3 is fixedly mounted on a shaft 41 which is journaled in the casing 2 and which, in the example considered, constitutes the power shaft. The power shaft may be rotated by any convenient means (not shown), for example, by a hand crank or an electric motor with reduction gear, in order to exert through the top part of the chain a pulling or pushing force according to the direction in which it is desired to rotate the sprocket wheel.

The guiding rollers 32 are designed to roll over an external guiding member 43 and an internal guiding member 44. The external guiding member 43 is constituted by the edge of a plate which is clamped by spacers 46 between two plates 47 and 48 forming the main portion of the casing 2, said plates and spacers being secured together by means of threaded studs 49 or other suitable means. The outline of the external guiding member 43 is concentric with the shaft 41 supporting the sprocket over which the chain runs and extends, in the specific embodiment illustrated, over a quarter of a circle 43a since the chain is to be deflected through a right angle as it runs through the casing and over the sprocket 3.

Beyond each point of tangential contact between the chain and the sprocket, this section of the outline extends through straight sections 43b and 43c, respectively, over a length equal to at least twice the pivot-to-pivot distance in any link, thereby ensuring faultless operation of the chain throughout.

Similarly, the internal guiding member 44 is provided with a quarter-circle portion joined to two straight sections which are parallel and equal in length to the straight sections of the external guiding member. The internal guiding member is likewise secured by means of threaded studs 52 extending through the two casing plates and the locating spacers. It is provided with a large aperture to accommodate the central portion of the sprocket 3, and it is precisely in order to enable the sprocket 3 to be mounted in the internal guiding member that it is built up in two separate halves.

Referring now to FIGURE 1, there is shown thereon means for attaching the first chain link 54, in the form of an eye 55 which, in relation to the plane containing the link pivots, is offset outwardly when considering the chain as it runs over the sprocket.

FIGURE 1 also shows a horizontal surface 56 upon which the lower face of the chain rests.

A transmission device as hereinbefore described operates as follows:

Assuming the first link 54 to be attached to a load which it is desired to move along the horizontal surface 56, then if the sprocket wheel 3 be rotated in the direction of arrow f (see FIGURE 1), the horizontal upper sections of the chain 1 will operate in traction like an ordinary chain. On the other hand, if the wheel be rotated in the opposite direction, then the upper chain sections will be made to push the load before them and to consequently operate in compression. In the latter case, the front operative faces of each link of these straight sections of the chain thrust against the rear operative faces of the adjoining link, so that the projecting portions of all the links in these chain sections together form a veritable bar which is as rigid as a one-piece bar but which may nonetheless wrap itself around and hug the circular contour of the sprocket as it runs over it.

Manifestly, when the portion of the chain wrapped round the sprocket is working in compression, it will tend to escape from the sprocket teeth, but this tendency will be counteracted by the guiding rollers cooperating with the internal edge of the external guiding member 43. The external and internal guiding members thus prevent chain deformation in compression or in traction in proximity to the sprocket.

While the above described chain structure constitutes a preferred form, it is to be understood that other specific chain structures operable around a bend under both tension and compression loads may be used if desired, and such structures fall within the scope of the invention.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. A transmission device comprising a sprocket wheel, said sprocket wheel having two axially spaced rows of teeth, a push-pull chain for transmitting both tension and compression, passed over said wheel and having a plurality of parallel links, pivot pins pivoting said links together, means to prevent flexing of the chain from a straight line in one direction, a central guide roller and two lateral drive rollers mounted on each pivot pin, said drive rollers engaging with said two rows of teeth of said sprocket wheel, and chain guiding means providing two mutually facing parallel guide surfaces having each a portion concentric with said wheel, the distance between said two guide surfaces being slightly greater than the diameter of each guide roller, and the thickness of said guide rollers as well as the width of said two guide surfaces being smaller than the axial spacing between said two rows of sprocket teeth.

2. A transmission device comprising a sprocket wheel, said wheel having two axially spaced rows of teeth, a push-pull chain for transmitting both tension and compression, passed over said sprocket wheel and having a plurality of links hinged together, means to prevent flexing of the chain from a straight line in one direction, a plurality of flanged guide rollers carried by said chain at longitudinally spaced points thereof, a drive roller positioned on said chain at each side of each guide roller, so as to engage each with a corresponding row of sprocket teeth and guiding means for said chain including a pair of parallel guide rails having each a portion concentric with said wheel, the axial spacing of said rows of sprocket teeth being greater than the thickness of said guide rollers, and said guide rails being engageable between the flanges of said guide rollers.

3. A transmission device comprising a sprocket wheel, said wheel having two axially spaced rows of teeth, a push-pull chain for transmitting both tension and compression, passed over said wheel and having a plurality of hinged links, means to prevent flexing of the chain from a straight line in one direction, a plurality of central guide rollers carried by said chain at longitudinally spaced points thereof, a plurality of transversely spaced drive rollers carried by said chain at each side of each guide roller so as to engage each with a corresponding row of sprocket teeth, the axial spacing of said two rows of sprocket teeth being greater than the thickness of said guide rollers, and chain guiding means including two mutually facing parallel guide surfaces spaced from each other by a distance slightly greater than the diameter of said guide rollers, each guide surface having a curved portion concentric with said sprocket wheel, and the radius of the inner of said curved surface portions being smaller than the radius of said sprocket wheel.

References Cited by the Examiner

UNITED STATES PATENTS

| | | | |
|---|---|---|---|
| 1,584,198 | 5/1926 | Stevens | 254—97 X |
| 1,870,244 | 8/1932 | Elston | 254—95 |
| 1,877,339 | 9/1932 | Kottlowski | 74—245 X |
| 2,045,261 | 6/1936 | Clute | 254—95 |
| 2,219,125 | 10/1940 | Bremer | 74—250 |
| 2,602,345 | 7/1952 | Braumiller | 74—250 |
| 2,869,379 | 1/1959 | Welser | 74—245 |
| 3,029,086 | 4/1962 | Stokvis | 74—245 X |
| 3,092,957 | 6/1963 | Larkin | 74—251 X |

DON A. WAITE, *Primary Examiner.*